(No Model.)  5 Sheets—Sheet 1.
F. H. RICHARDS.
WEIGHING MACHINE.
No. 589,274. Patented Aug. 31, 1897.
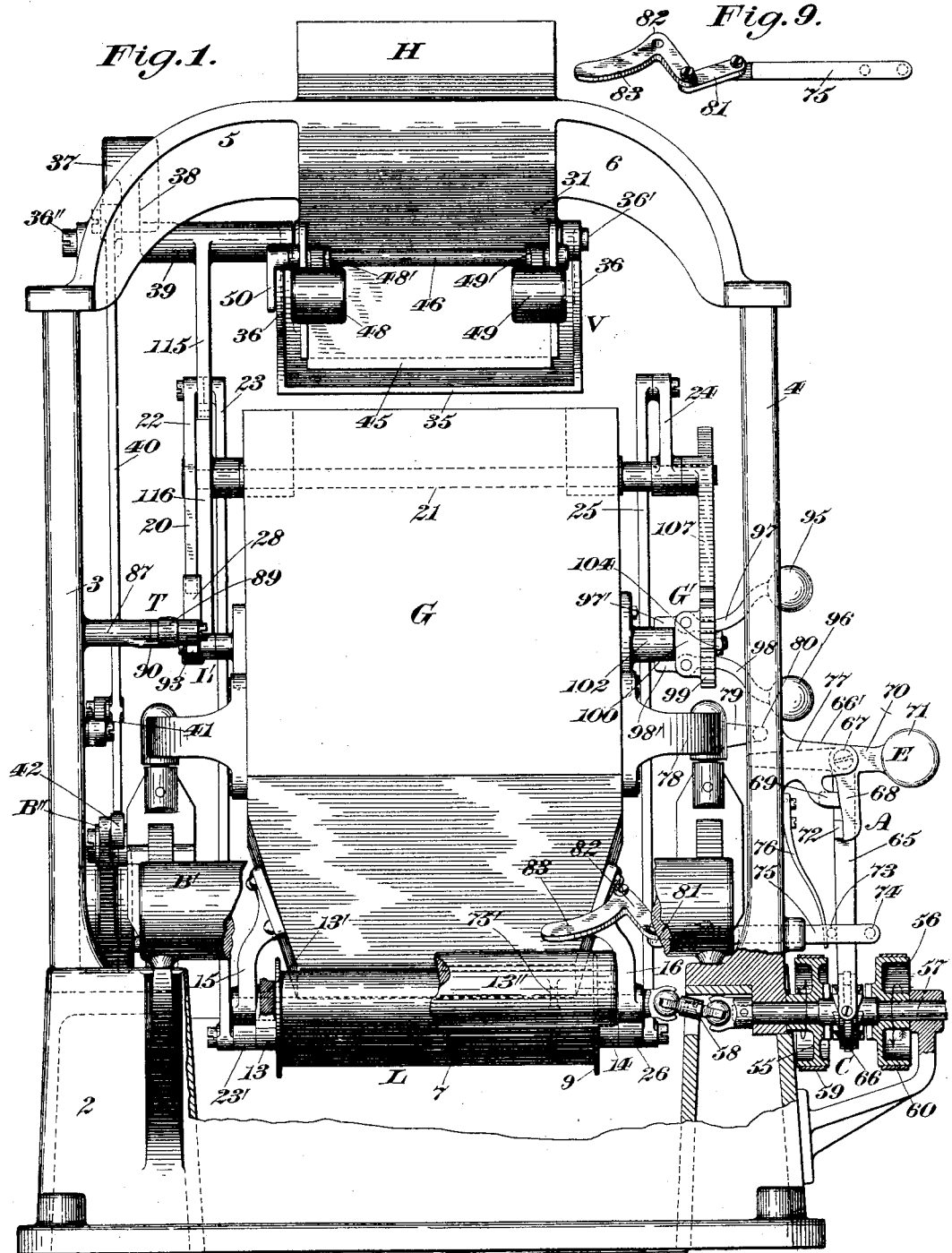
Witnesses:
Chas. D. King
Fred. J. Dole.
Inventor:
F. H. Richards (No Model.) 5 Sheets—Sheet 2.
F. H. RICHARDS.
WEIGHING MACHINE.
No. 589,274. Patented Aug. 31, 1897.
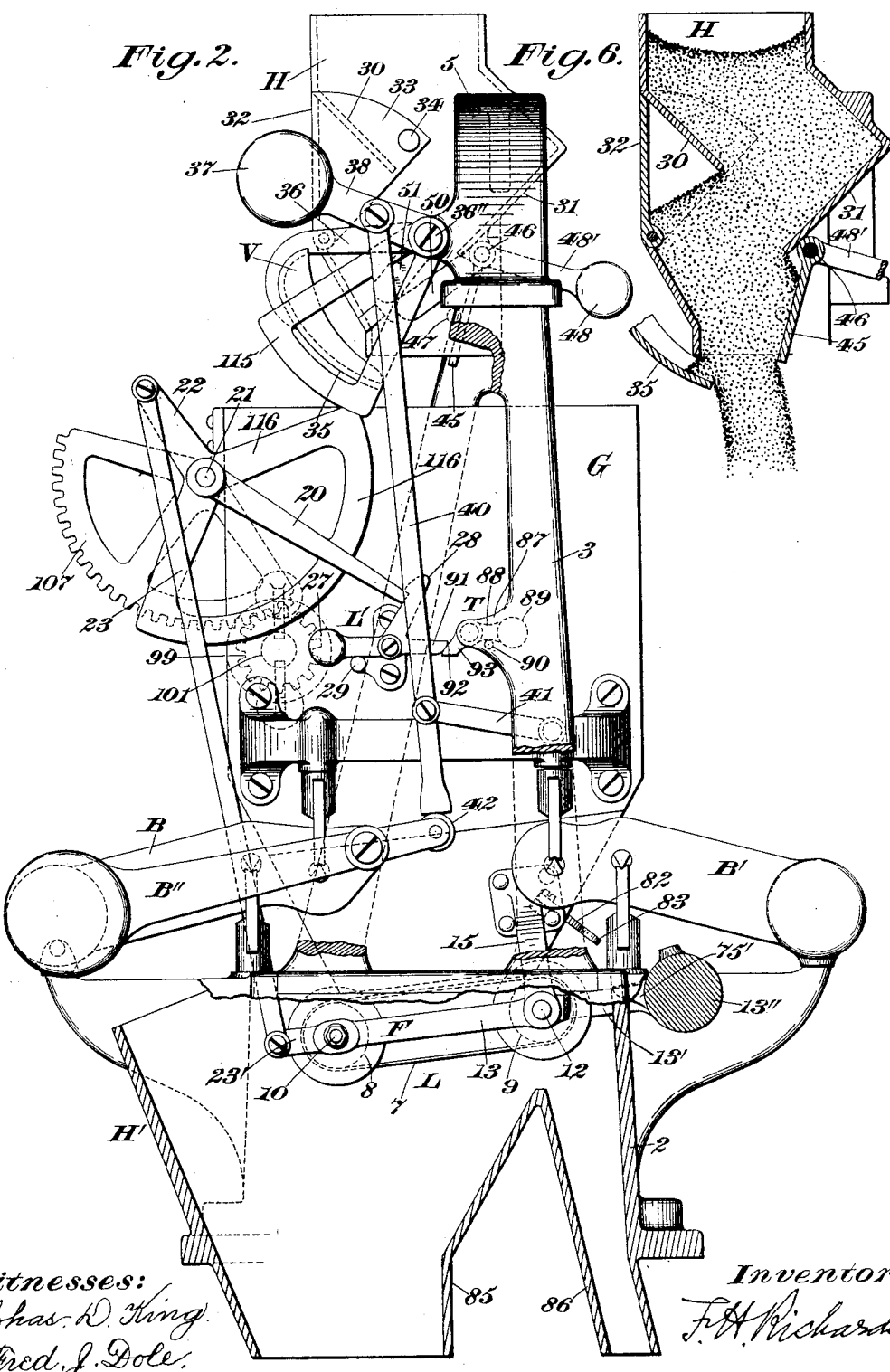
Witnesses:
Chas. D. King
Fred. J. Dole
Inventor:
F. H. Richards

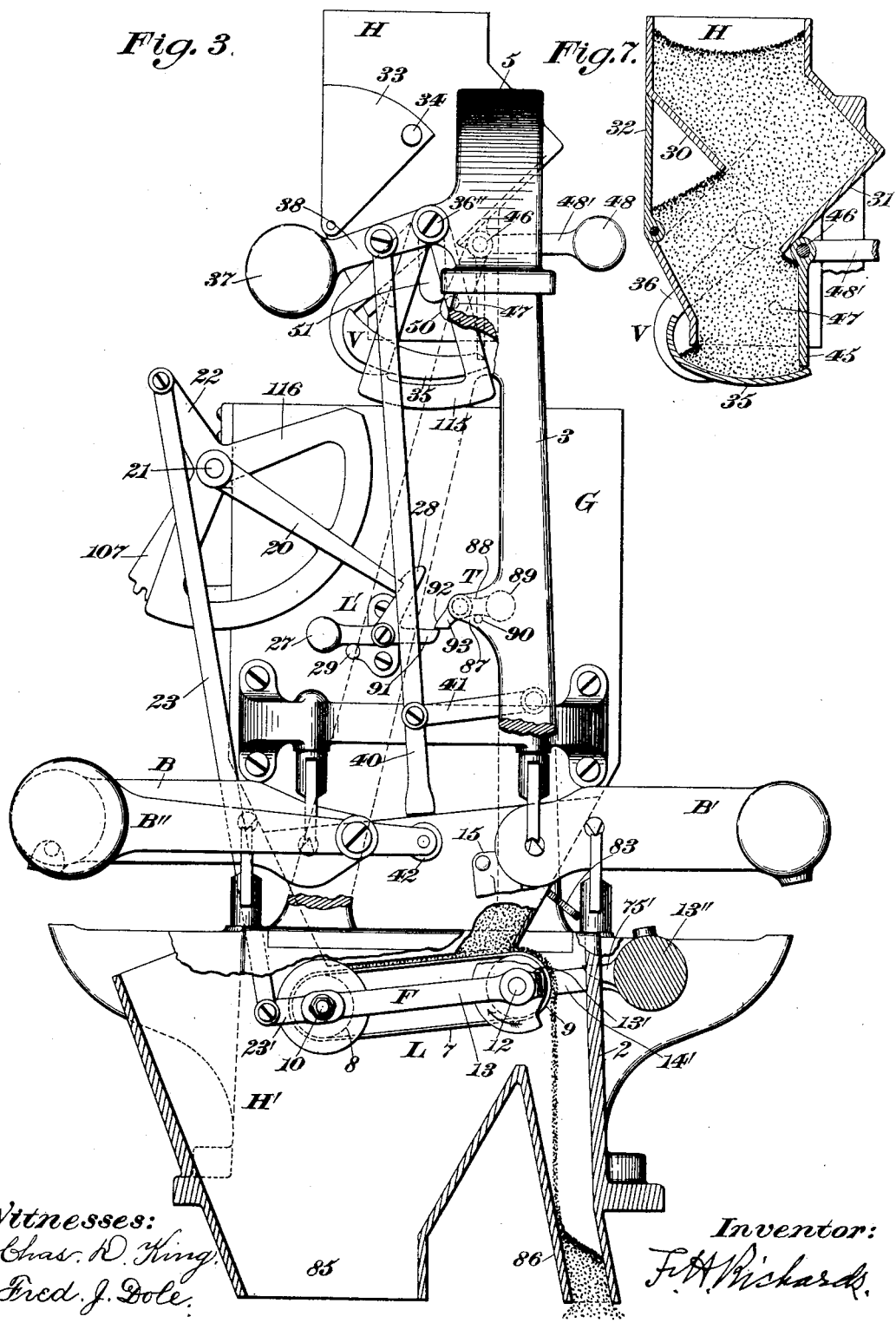

(No Model.)  5 Sheets—Sheet 4.
F. H. RICHARDS.
WEIGHING MACHINE.
No. 589,274.  Patented Aug. 31, 1897.
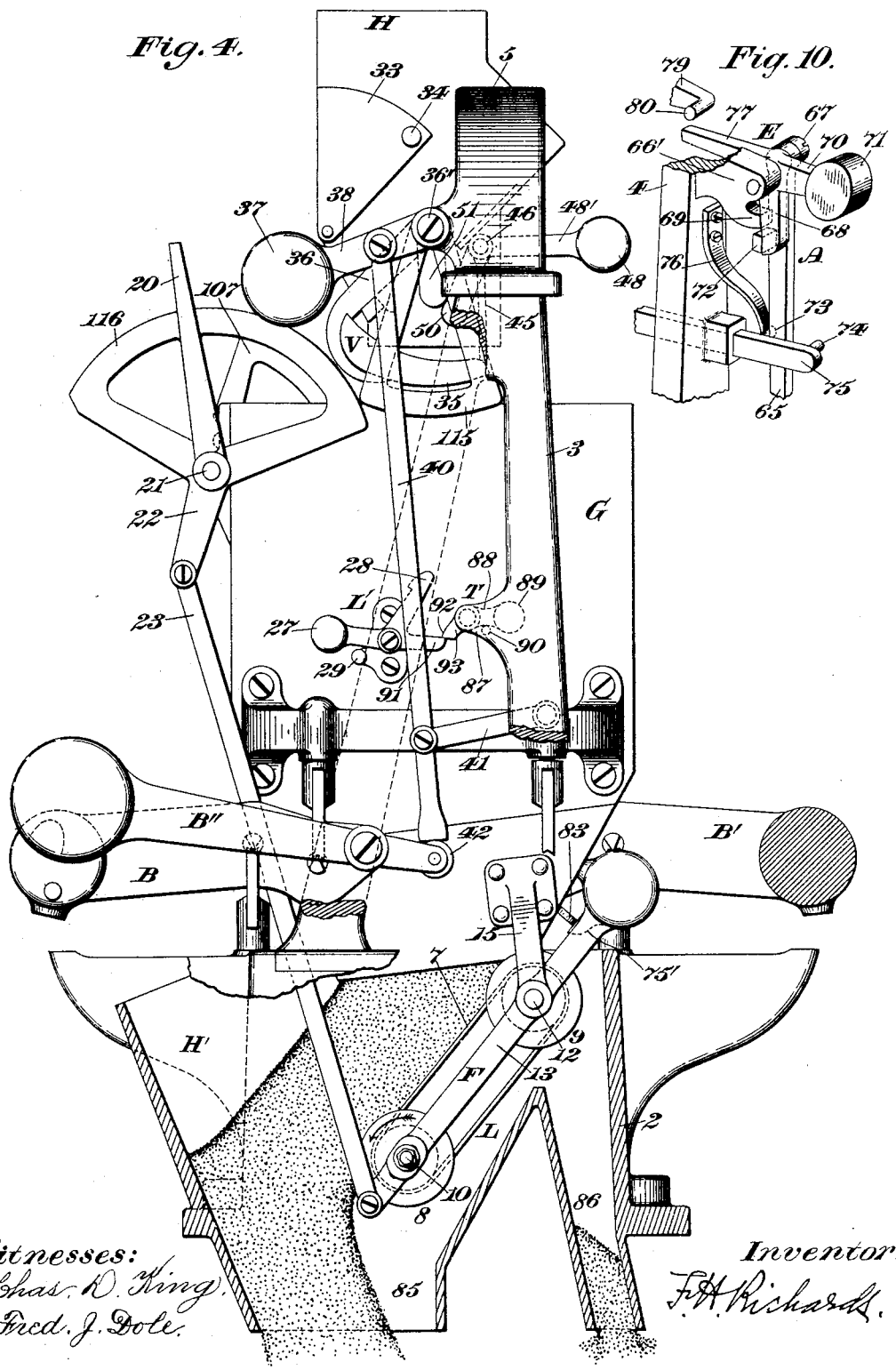
Witnesses:
Chas. D. King.
Fred. J. Dole.
Inventor:
F. H. Richards.

(No Model.)   5 Sheets—Sheet 5.
F. H. RICHARDS.
WEIGHING MACHINE.
No. 589,274. Patented Aug. 31, 1897.
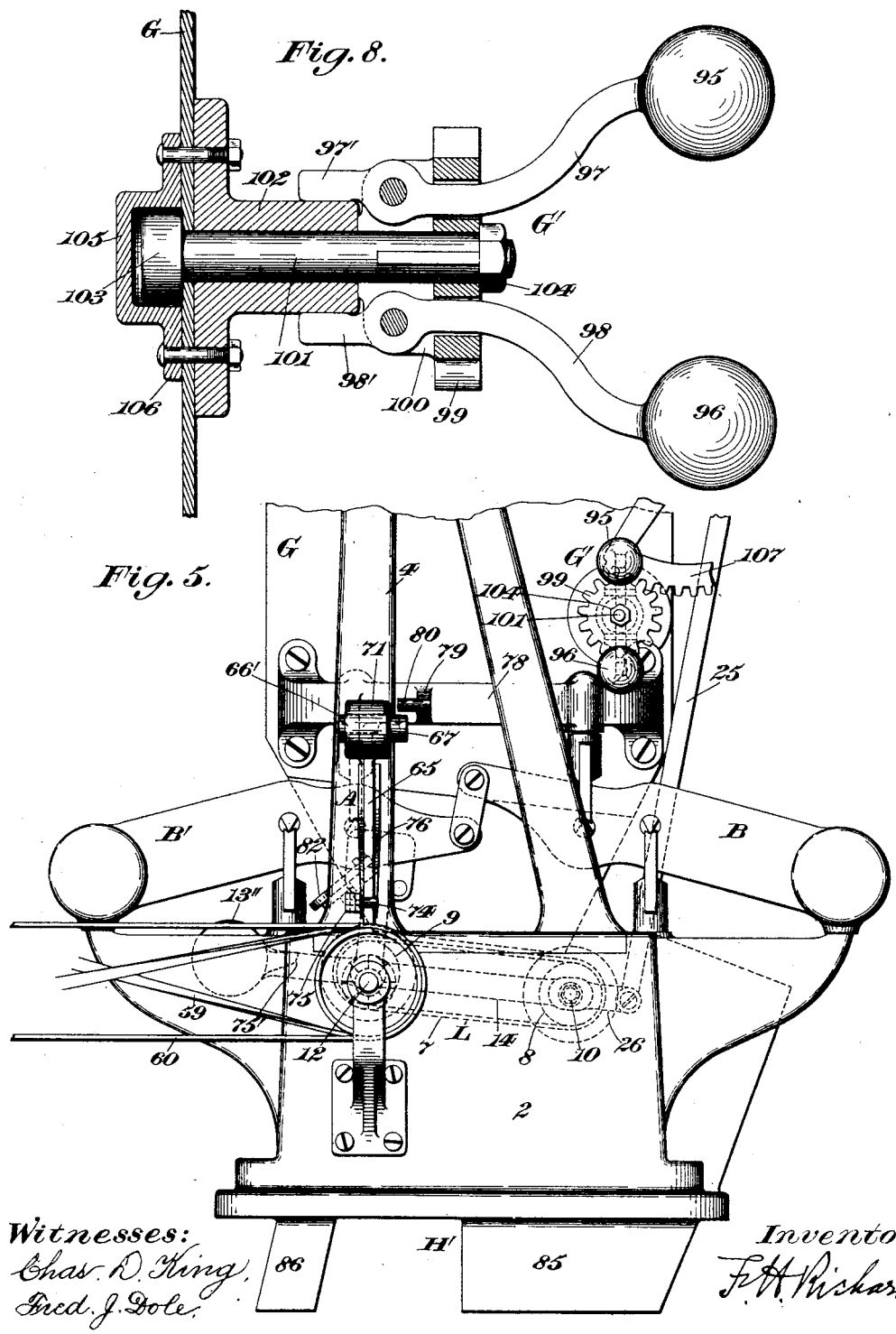
Witnesses:
Chas. D. King
Fred. J. Dole
Inventor:
F. H. Richards
THE NORRIS PETERS CO., PHOTO-LITHO., WASHINGTON, D. C.

UNITED STATES PATENT OFFICE.

FRANCIS H. RICHARDS, OF HARTFORD, CONNECTICUT.

WEIGHING-MACHINE.

SPECIFICATION forming part of Letters Patent No. 589,274, dated August 31, 1897.

Application filed April 3, 1897. Serial No. 630,509. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing and delivering various classes of granular and similar substances.

With respect to one of its features the invention comprehends the provision of stream-supplying means comprising a hopper and a reciprocatory valve of suitable construction and a device, such as a plate, supported adjacent to the delivery end of the hopper for reciprocation, instrumentalities of a suitable nature being preferably provided for moving said device in a direction coinciding with the movement of the valve on its closure, whereby the mass sustained on the valve can be so spread out as to materially reduce its resistance to the shutting of said valve.

Another object of the invention is to provide weighing mechanism including a conveyer of any suitable type and mechanism for driving the same in reverse or opposite directions.

My present invention is of the kind that delivers to the load-receiver an overload, the excess being subsequently removed to poise the load, and said conveyer constitutes a convenient medium for withdrawing said excess when operated in one direction, it being adapted when oppositely driven to conduct the true or predetermined charge from the weighing mechanism.

A further object of the invention is to furnish, in combination with the shiftable load-discharge member of the weighing mechanism, which in the present case consists of a closer for the discharge-outlet of the load-receiver, suitable means for retarding the action thereof, so that as it discharges a load and returns to its normal position it cannot jar or injure the weighing mechanism.

In the drawings accompanying and forming part of this specification, Figure 1 is a front elevation, partially in section, of my improved weighing-machine with parts broken away to show certain features thereof. Figs. 2, 3, and 4 are end elevations of the machine as seen from the left in Fig. 1, showing the parts in three different positions, the base being removed to illustrate the action of the conveyer or closer. Fig. 5 is an end elevation of the lower part of the machine as seen from the right in Fig. 1. Figs. 6 and 7 are longitudinal central sections of the principal parts of the supply mechanism. Fig. 8 is a sectional elevation of a governor employed for retarding the action of the closer. Fig. 9 is a detail view in perspective of a portion of the means provided for shifting the driving mechanism for the conveyer or closer, and Fig. 10 is a detail in perspective hereinafter more particularly described.

Similar characters designate like parts in all the figures of the drawings.

The framework for sustaining the various parts of the machine may be of any suitable or preferred character, it comprising in the present case the chambered base or bed 2, the end frames or columns 3 and 4, which rise therefrom, and the brackets 5 and 6, extending oppositely from the supply-hopper H and surmounting the two end frames, said parts being connected together in some convenient manner.

My present invention is of the class covered by Letters Patent No. 572,067, granted to me November 24, 1896, to which reference may be had. In the machine disclosed by said patent, as in the present case, means of a suitable nature are provided for delivering or conducting to the load-receiver an overload or a supply of material beyond or in excess of that determined upon for a true or predetermined charge, load-reducing means being furnished to remove or withdraw from the load-receiver the surplus or overload, the residue or remainder in the load-receiver constituting the true charge.

In the present case the hopper H constitutes a suitable agent for delivering to the load-receiver the overload, the stream from the hopper being controlled or regulated by a suitable valve, as will hereinafter appear.

The weighing mechanism, as is usual, comprises a suitable load-receiver and a supporting beam or beams therefor.

The load-receiver in the present case consists of a hopper-shaped receptacle, as G, the receiving end of which is contiguous to the delivery-outlet of the hopper H, and the discharge-outlet of said load-receiver will be preferably covered by a closer which when shut is adapted to carry or sustain the mass in the load-receiver.

The supporting scale-beams for the load-receiver are two in number and are designated, respectively, by B and B', they being pivotally mounted upon the supporting-base 2 and the load-receiver being preferably sustained upon the poising ends of the beams, these several features of construction being similar to those disclosed in Letters Patent to which I have hereinbefore alluded. The load-receiver has in its lower or delivery end a discharge-outlet of suitable size, through which the predetermined charge can pass, and said outlet will be normally covered by a closer, such as L, consisting of a conveyer, which may be in the form of an endless belt, as shown at 7, the upper run of which is preferably adjacent to but not in contact with the lower edge of the load-receiver when the closer is shut, said closer being connected with the load-receiver for shifting movement relatively thereto. The endless belt 7 is passed around the drums or rolls 8 and 9, the shafts 10 and 12 of which are carried by the longitudinal members 13 and 14 of the frame F, said shaft 12 being journaled in the bearings or brackets 15 and 16, that depend from the opposite forward sides of the load-receiver, whereby the closer L can have the necessary opening and shutting movements.

The closer L or the frame F thereof is furnished with the forwardly-projecting arms 13' and 14', respectively, which are joined by the weight 13'', that is adapted to return the closer to its shut position on the discharge of a load.

It is apparent that any other type of conveyer could be substituted for that illustrated or that the conveyer itself might constitute the load-receiver without departing from the scope of the invention.

The means which control the discharge of the load include as a part thereof a detent or latch of suitable nature, which is adapted to engage a member connected with the closer, such as the crank-arm 20, extending from the transverse rock-shaft 21, suitably supported on the rear wall of the load-receiver, said rock-shaft having a second crank-arm 22, to which is pivoted the longitudinal connecting-rod 23, the latter being likewise attached to the extension 23' of the closer-frame F.

The rock-shaft 21 has at its opposite end the crank-arm 24, to which is pivoted the connecting-rod 25, jointed to the extension 26 of the closer-frame F, said rod being adapted to move in parallelism with the rod 23 as the closer L opens and shuts.

The closer-holding latch is designated by L', it being pivoted to the load-receiver or a suitable bracket thereon, as is customary, and being provided with the counterweighted arm 27, which throws the catch-arm 28 into engagement with the coöperating crank-arm 20 on the transverse rock-shaft 21, the action of said latch being limited by the pin 29, which is mounted in the usual manner.

The hopper H, as hereinbefore stated, constitutes a convenient means for delivering the necessary overload to the load-receiver, it having the oppositely-disposed break-walls 30 and 31, which are disposed in the path of movement of the supply-stream and which break the force of impact thereof.

The hopper H has pivoted thereto the plate 32, which constitutes a part of the rear wall thereof and which may be swung outward to provide access to the interior of the hopper for removing sticks and other foreign substances in the supply, said plate having the walls 33 at its ends, which lap over the hopper, one of said walls being provided with a thumb-piece, as 34, by which the plate can be readily operated.

The stream-controller or valve for the hopper may be of any suitable type, it consisting in the present case of a reciprocatory valve movable beneath the outlet of the hopper. The valve is designated in a general way by V and consists of a curved plate 35, secured to the arms 36, the hubs of said arms being adapted to receive the pivots 36' and 36'', the first-mentioned projecting from the hopper H and the other being carried by the bracket 5.

The valve advancing or closing device consists in the present case of the weight 37, fixed to the free end of the arm 38, extending rearward from the elongated hub 39 of the valve-arm 36, said weight exerting a constant valve-closing action, which, however, is properly limited or controlled by the weighing mechanism, as will hereinafter appear.

The actuator-arm 38 has pivoted thereto the depending rod 40, which is connected, preferably, by the link 41 to the framework, the free end of said rod being adapted to bear against the auxiliary beam B'' or a projection, as the antifriction-roll 42 thereon, so that as the load-receiver descends the projection or roll 42, by falling away from the rod 40, will permit the closure of the valve V by the dropping of the counterweight 37. When the auxiliary beam B'' returns to its normal position, it will force the rod 40 upward for opening the valve V.

In connection with the stream-controller or valve a suitable device, such as the plate 45, will be supported adjacent to the delivery end of the hopper for reciprocation, said plate being adapted to move in a direction coinciding with the valve on its closure. The plate 45 is fixed to the rock-shaft 46, that works in suitable bearings on the front of the hopper H, and it constitutes substantially the lower front part of the hopper, whereby the latter is provided with a regulable throat or outlet. Said plate is held in its extreme inward position and against a stop or pin 47 on the inside of the hopper by suitable means, such as the weights 48 and 49 on the ends of the arms 48' and 49', respectively, extending from the said plate, whereby the outlet of the hopper will be somewhat contracted during the greater period of operation of the machine.

At a predetermined point in the closure of the valve means will be provided for swinging the plate 45 in a direction corresponding with the direction of movement of the valve, whereby the mass sustained thereon will be permitted to spread out, as shown in Fig. 7, so as materially to reduce its resistance to said valve, whereby the latter can be readily shut to arrest the passage of the supply to the load-receiver, the plate 45 being held in contact with the banked-up mass on the valve by the two weights 48 and 49, so that the material cannot run into the overloaded receiver G. The means for shifting the plate 45 relatively to the valve to permit the spread of the material sustained thereon is preferably connected with the valve for operation.

The plate 45 has suitably affixed thereto the straight arm 50, which is disposed in the path of movement of the arm 51, extending from the hub 39, the parts being so situated that when the valve has reached a point very near the end of its cut-off stroke the plate-shifting device or arm 51 will abut against the coöperating arm 50 on the plate 45, whereby on the continuation of the valve movement the plate will be so actuated as to permit the freeing of the material, so that the valve can be readily closed.

The hopper H when the valve V is open, as represented in Figs. 2 and 3, is designed to direct or deliver to the load-receiver a sufficient quantity of material to overload the same and carry it below the so-called "poising-line," at which time suitable instrumentalities are called into play for withdrawing the overload or surplus.

The closer L, which is in the form of an "endless" conveyer and will be so referred to hereinafter, constitutes an efficient device for removing the surplus, it being driven in one direction to effect this result and being oppositely rotated to discharge or force the true load from the load-receiver.

The driving means for the conveyer L includes two rotary and continuously-operative drivers, such as the pulleys 55 and 56, which are loose on the shaft 57, the latter being journaled in the supporting-base 2 and being also connected by the universal coupling 58 of ordinary construction with the shaft 12 of the conveyer L.

The pulleys 55 and 56 are shown connected by the belts 59 and 60 with a suitable power-drum, (not shown,) the belt 59 being crossed to secure the necessary reverse rotation.

The two drivers or pulleys are alternately thrown into and out of operative relation with the conveyer L by suitable means, as by the double clutch C, which is suitably splined to and slides on the supporting-shaft 57, said clutch having the usual teeth or serrations on its opposite faces for engaging coöperating teeth on the adjacent faces of the two pulleys 55 and 56, as shown in Fig. 1. The direction of rotation of each of the pulleys is indicated by the arrow marked thereon in said figure, the pulley 56 when coupled to the conveyer L or the supporting-shaft 57 being designed to operate it for removing the overload, and when the pulley 55 is subsequently thrown into operative connection with said conveyer the latter will be reversely operated to force the measured charge from the load-receiver.

The actuator for the clutch C is denoted by A, and it consists in the present case of a pendent forked bar 65, carried by the pivot-pin 67, the branches of the fork at the lower end thereof being connected with the split ring 66, that lies in a peripheral groove on the clutch C.

The clutch-actuator A will be operated in one direction by means controlled by the weighing mechanism or its load-receiver and in the other direction by instrumentalities coöperative with the closer or conveyer L, whereby the pulleys 55 and 56 can be coupled to their supporting-shaft 57 and likewise to said conveyer. The actuator A is loosely suspended from the pin 67, suitably fixed to the bracket 66' on the end frame 4, said pin 67 also carrying the three-armed lever E, the arm 68 of which is adapted normally to rest against the stop 69 on said bracket.

The arm 70 of the lever E, which acts as a stop, is furnished with a counterweight 71 of proper efficiency, and the actuator A has thereon the lug or protuberance 72, which abuts normally against the arm 68 of the lever E, whereby the said weight will hold the actuator in its intermediate or ineffective position. (Represented in Fig. 1.) The actuator A passes between the pins 73 and 74 on the slide 75, the latter projecting through and loosely fitting in a suitable transverse guide-aperture in the end frame 4. For the purpose of throwing the actuator in a direction to couple the clutch C and the pulley 56 any suitable device may be employed, such as the curved spring 76, which is fastened to the outside face of the end frame 4 and which is adapted to press against the pin 73 on the slide 75. The third arm 77 of the lever or stop E is disposed in the path of movement of a suitable device on the load-receiver, whereby the weight 71 can be lifted to free the actuator A, so that the spring 76, by acting against the actuator A, can throw the clutch C into engagement with the pulley 56, as will be apparent.

The hanger 78 on the load-receiver has a projection 79, which at its outer end is provided with the laterally-extending pin 80, adapted to impinge against the arm 77 of the lever E when the load-receiver passes below the poising-line with its overload, so that the weight 71 will be elevated to free the actuator A, at which time the spring 75 can slide the clutch C along the shaft 57 and into engagement with the pulley 56 to drive the conveyer or closer L in the direction indicated by the arrow in Fig. 3. As the closer is thus operated it is adapted to force from the load-receiver the surplus material, and as this takes place the lightened load-receiver will rise, whereby the pin 80, by ascending and moving away from the arm 77, will permit the weight 71 to drop, so that the arm 68 of said lever, being in contact with the lug 72 on the actuator A, will swing said actuator and uncouple the clutch C from the pulley 56, such movement continuing until the lever-arm 68 abuts against the fixed stop 69.

The means for throwing the clutch C into connection with the pulley 55, and hence with the conveyer L, will be governed by the latter on its dropping or opening movement to discharge the measured load. The slide-bar 75 has pivoted thereto at its inner end the link 81, which extends obliquely therefrom, said link being pivotally attached to the elbow lever or trigger 82, pivoted to the load-receiver at a point near the lower end thereof, the arm 83 of said lever being adapted to receive a blow from the closer L as the latter opens to force the slide 75 inward, whereby the pin 74, by striking the actuator A, will swing the same in a corresponding direction to couple the clutch C and the pulley 55.

Let it be assumed that the latch L' is tripped to release the conveyer or closer L and that the latter is forced open. As the closer drops the weight 13'' of its frame F will be oppositely moved, so that the lug 75' on said weight can strike the arm 83 of the elbow-lever 82 to move the slide 75 inward, whereby the pin 74 will be carried against the actuator A to force the same in a corresponding direction and the clutch C along the shaft 57 to couple it to the pulley 55, so that the conveyer or closer L will be driven in the direction of the arrow in Fig. 4 to force the charge from the load-receiver. When the closer shuts, the lug 75' of course will fall away from the elbow-lever 82, whereby the slide 75, and consequently the actuator A, can be returned to their intermediate or idle positions (shown in Fig. 1) by the spring 76 or until the lug 72 abuts against the arms 68 of the lever or stop 71, it being understood that the power of the weight 71 exceeds that of the spring 76.

I prefer to locate below the load-receiver a duplex hopper, such as H', which is suitably secured within the chambered base 2 and which has the branches or conduits 85 and 86, respectively, situated below the opposite ends of the conveyer or closer L, the conduit or branch 86 being adapted to receive the small stream which is fed from the load-receiver during the poising period of the weighing of a load, and the other or larger conduit 85 being intended to receive the measured charge, as represented, respectively, in Figs. 3 and 4. The material received by the auxiliary or smaller conduit 86 can, if desired, be conducted to the hopper H for redelivery to the load-receiver, as illustrated in the Letters Patent hereinbefore referred to.

The tripper for the closer-latch L' is designated by T, and it consists of a by-pass device pivotally mounted on the end frame 2 or the projection 87 thereon. The tripper is in the form of a small lever, the arm 88 of which is weighted, as at 89, said arm being adapted to rest normally upon the stop 90 of the projection 87, as indicated in Fig. 2.

At the commencement of operation the arm 91 of the latch-lever will be above and in contact with the oblique face 92 of the arm 93 of said tripper, and as the load-receiver descends the weighted arm 88 will be raised by the latch to permit the latter to pass below the tripper, as represented in Fig. 3. As the load-receiver rises during the removal of the overload and when the load or charge is poised the arm 91 of the latch will abut against the arm 93 of the tripper T, whereby the arm 28 of said latch will be disengaged from the crank-arm 20 on the transverse shaft 21 to release the closer or conveyer L, whereby the latter can then be promptly forced open by the weight of the material in the load-receiver.

The closer L being comparatively large and heavy and sustaining a considerable amount of weight, instrumentalities are furnished for retarding the action thereof as it drops to discharge the load, said instrumentalities being also effective to retard or impede the return stroke of the closer, whereby the latter, as it reciprocates, cannot jar or injure the weighing mechanism and in time impair its accuracy.

The closer-retarding means is operated by centrifugal force, it consisting of a governor, such as G', which is operative, respectively, with multiplying or differential gearing situated between said governor and the closer, whereby on the initial movement of the latter in either direction said governor is rendered effective to impede the action of the closer.

The governor G' comprises two balls 95 and 96 at the outer ends of the arms 97 and 98, the latter being connected with a suitable pinion, as 99. The pinion 99 has on its inner face two flanges, as 100, between which the two governor-arms 97 and 98 are pivoted, said arms passing through suitable transverse apertures in the pinion, the walls of the apertures limiting the action of the two arms. The pinion 99 is keyed or otherwise secured to the rock-shaft 101, which is supported in part by the hub or bearing 102, fastened to the load-receiver G, the shaft 101 having at its inner end a collar 103, the flat face of which is adapted to fit against the inside face of the load-receiver, as represented in Fig. 8, said collar being adapted to prevent the withdrawal of the shaft 101, and the pinion being held in place by the nut 104 on the outer end of the shaft 101. The collar or head 103 of the shaft 101 is covered by a cap 105, the annular flange 106 of which can be suitably secured to the inside of the load-receiver G.

The pinion 99 meshes with the large sector-gear 107, which is fixed to the transverse rock-shaft 21 on the load-receiver. The inner ends 97' and 98' of the governor-arms 97 and 98, respectively, are adapted frictionally to engage the periphery or circumference of the cylindrical hub or bearing 102 as the closer opens and shuts, whereby the action of the latter is retarded to such an extent as to preclude the possibility of jarring.

On the initial opening of the closer L the shaft 21, by reason of its connection with said closer, will be rocked, the toothed sector-gear 107 being swung in a corresponding direction, and by reason of its difference in size over the gear or pinion 99 the latter will be rapidly rotated to throw the governor-balls 95 and 96 outward for causing the free ends 97' and 98' of the two arms 97 and 98 to bite against the hub 102, whereby the closer cannot be opened too rapidly.

It will be understood that on the return of the closer the action will be the same, except that the movement of the two gears will be reversed.

A segmental stop is shown at 115, operative with the valve, it being affixed to the hub 39 and being adapted to coöperate with the stop 116 on the shaft 21, said stops being similar in construction and operation to those shown and described in the Letters Patent hereinbefore referred to.

The operation of the hereinbefore-described machine, briefly stated, is as follows: Fig. 2 represents the positions occupied by the different parts at the commencement of operation, the closer or conveyer L being shut and held in such position by the latch L', which engages the crank-arm 20, and the valve V being wide open a stream of large volume will descend from the hopper H into the empty load-receiver to overload the same. When a certain percentage of the supply has been received by the load-receiver, it will descend with the beam mechanism, and the free end of the auxiliary beam B" or the projection 42 thereon, by falling away from the rod 40, will permit the closure of the valve V by the dropping of the actuator or weight 37, such movements continuing until the load-receiver is overcharged, at which time it will have reached a point below the poising-line. As the load-receiver passes below the poising-line the pin 80 will strike the arm 77 of the stop or lever E and will raise the weight 71, whereby the spring 76, by acting against the pin 73, which bears against the actuator A, will force said actuator and clutch C (see Fig. 1) to the right, whereby said clutch will be caused to engage the pulley 56 to couple it to the shaft 57, so that the latter, and consequently the conveyer L, will be rotated in the direction shown by the arrow in Fig. 3 to remove from the load-receiver the surplus, which is delivered into the conduit 86, as shown in said figure. As the load-receiver is thus lightened it will rise and the pin 80, by moving away from the arm 77, will permit the weight 71 to drop, whereby the arm 73, being against the lug 72, will throw the actuator A to its intermediate or ineffective position, (shown in Fig. 1,) the surplus at this time having been removed. When the load-receiver descends, as hereinbefore specified, the arm 91 of the latch L' will strike and will pass by the arm 93 of the by-pass tripper T, as shown in Fig. 3, whereby as the load-receiver rises and when it reaches the poising-line (indicating the obtainment of the predetermined charge) said latch-arm 91 will abut against the tripper-arm 93, so that the arm 28 of the latch can be disengaged from the crank-arm 20 to release the closer or conveyer L. When the latch is tripped, as thus specified, the closer will be forced open, the arm 13' being caused to move in the opposite direction and to impinge against the arm 83 of the elbow-lever 82, whereby the bar 75 is slid inward to carry the pin 74 against the actuator A to move the same, and consequently the clutch C, in a corresponding direction, whereby the latter will be connected with the pulley 55 to operate the conveyer L in the direction shown by the arrow in Fig. 4. When the material has passed from the conveyer or closer L, the latter will be shut by the counterweight 13" and the other parts of the machine will be caused to resume their initial positions to repeat the operation, it being understood that as said closer shuts the spring 76 is operable to return the clutch C to its intermediate or ineffective position.

Having described my invention, I claim—

1. The combination, with weighing mechanism embodying a conveyer; of means controlled by the weighing mechanism, for driving said conveyer in opposite directions.

2. The combination, with weighing mechanism embodying a load-receiver, of a conveyer mounted on said load-receiver; and means controlled by the weighing mechanism, for driving said conveyer in opposite directions.

3. The combination, with weighing mechanism including a load-receiver having a discharge-outlet, of a conveyer situated to close said outlet; and means controlled by the weighing mechanism, for driving said conveyer in opposite directions.

4. The combination, with weighing mechanism including a load-receiver having an outlet, of a conveyer shiftably connected with the load-receiver and adapted normally to close said outlet; and means controlled by the weighing mechanism, for driving said conveyer in opposite directions.

5. The combination, with weighing mechanism including a load-receiver having a discharge-outlet, of a counterweighted conveyer situated to close said outlet; and means controlled by the weighing mechanism, for driving said conveyer in opposite directions.

6. The combination, with weighing mechanism including a load-receiver having a discharge-outlet; of an endless conveyer mounted on the load-receiver, the upper run of said conveyer being situated adjacent to the load-receiver; and means controlled by the weighing mechanism, for driving said conveyer in opposite directions.

7. The combination, with weighing mechanism comprehending a conveyer; of driving mechanism for said conveyer, including a pair of drivers operative in reverse directions; and means controlled by the weighing mechanism, for successively throwing said drivers into operative connection with the conveyer.

8. The combination, with weighing mechanism comprehending a conveyer; of driving mechanism for said conveyer, embodying two reversely-rotative drivers; and means controlled by the weighing mechanism, for successively throwing said drivers into operative connection with the conveyer.

9. The combination of weighing mechanism comprehending a conveyer; driving mechanism for said conveyer, including two continuously and reversely operative drivers; and means controlled by the weighing mechanism, for successively throwing said drivers into operative connection with the conveyer.

10. The combination of weighing mechanism comprehending a conveyer; driving mechanism for said conveyer, including two reversely-operative drivers; a clutch; and means controlled by the weighing mechanism, for successively coupling said clutch to said drivers.

11. The combination, with weighing mechanism comprehending a conveyer; of means controlled by the weighing mechanism, for driving said conveyer in reverse directions; and a duplex hopper coöperative with the conveyer.

12. The combination, with weighing mechanism comprehending a conveyer, of a duplex hopper the respective branches of which are situated below the two ends of the conveyer; and means controlled by the weighing mechanism, for driving said conveyer in reverse directions.

13. The combination, with weighing mechanism embodying a load-receiver, of overloading means therefor; a conveyer mounted upon the weighing mechanism; and means controlled by the weighing mechanism, for driving said conveyer in reverse directions.

14. The combination, with weighing mechanism comprehending a load-receiver having a discharge-outlet, of a conveyer shiftably connected with the load-receiver and constituting a closer for the discharge-outlet; a driver; and means controlled by the conveyer, for throwing the driver into operative connection therewith.

15. The combination, with weighing mechanism comprehending a load-receiver having a discharge-outlet, of a conveyer shiftably connected with the load-receiver and constituting a closer for the discharge-outlet; a driver; a slide coöperative with the driver; and means connected with the conveyer or closer, for operating said slide.

16. The combination, with weighing mechanism comprehending a load-receiver having a discharge-outlet, of a conveyer shiftably connected with the load-receiver and constituting a closer for the discharge-outlet; a shaft carrying a driver, said shaft being connected with the conveyer; a clutch; an actuator for said clutch; and a slide for operating said actuator, said slide being operated by a device connected with the conveyer.

17. The combination, with weighing mechanism comprehending a load-receiver having a discharge-outlet, of a conveyer shiftably connected with the load-receiver and constituting a closer for the discharge-outlet; a driver for the conveyer; a clutch; an actuator for said clutch; a slide provided with pins between which the actuator is disposed; and means connected with the conveyer, for operating said slide.

18. The combination, with weighing mechanism comprehending a load-receiver having a discharge-outlet, of a conveyer shiftably connected with the load-receiver and constituting a closer for said discharge-outlet; a driver; a slide coöperative with the driver; a lever on the load-receiver, connected with said slide; and a device connected with the closer, for imparting a blow to said lever.

19. The combination, with weighing mechanism comprehending a discharge-outlet, of a conveyer shiftably connected with the load-receiver and constituting a closer for the discharge-outlet; a driver; a slide coöperative with the driver and carried by the framework; a link pivoted to said slide; an elbow-lever mounted on the load-receiver and connected with said link; and a device coöperative with the closer, for imparting a blow to said lever.

20. The combination, with weighing mechanism comprehending a conveyer; of driving mechanism for said conveyer, including two drivers; a clutch; an actuator for said clutch; a stop for holding the actuator in an ineffective position; a spring adapted to operate the actuator to force it to throw the clutch into engagement with one of the drivers; and means for subsequently throwing the clutch into connection with the other driver.

21. The combination, with weighing mechanism comprehending a conveyer; of driving mechanism for said conveyer, including two drivers; a clutch; an actuator for said clutch; a pin from which the actuator is loosely suspended; a lever against one arm of which a lug on said actuator is adapted to bear; and a device on the load-receiver, for operating said lever.

22. The combination, with weighing mechanism comprehending a conveyer; of driving mechanism for said conveyer, including two drivers; a clutch; an actuator for said clutch; a pin from which the actuator is loosely suspended; a slide having pins between which said actuator is disposed; a spring bearing against one of the last-mentioned pins; a weighted lever on the support for the actuator; a lug on the actuator, bearing against one of the arms of said lever; and means on the load-receiver, for operating said lever.

23. The combination, with weighing mechanism including a load-receiver having a closer connected to said load-receiver for shifting movement relatively thereto, of overloading means; and means for first operating the closer, to cause it to remove the surplus from the load-receiver, the remainder in the latter constituting the true load, and for subsequently operating the closer to effect the removal of the true load.

24. The combination, with weighing mechanism including a load-receiver provided with a closer, of a centrifugal retarding device; and gearing situated between and coöperative, respectively, with the retarding device and closer.

25. The combination, with weighing mechanism including a load-receiver provided with a closer; of a shaft having a gear, said shaft being connected with the closer; a pinion meshing with said gear; and a governor connected with the pinion.

26. The combination, with weighing mechanism including a load-receiver provided with a closer; of a shaft carrying a gear, said shaft being connected with the closer; a hub on the load-receiver; a pinion meshing with said gear; a governor; and arms connected with the pinion, said arms being adapted frictionally to engage said hub.

27. The combination, with weighing mechanism embodying a load-receiver having a discharge-outlet; of a conveyer mounted on the load-receiver, for shifting movement and constituting a closer for said outlet; and means coöperative with the conveyer, for retarding the action thereof.

28. The combination, with weighing mechanism embodying a load-receiver, of a conveyer mounted on the load-receiver; a shaft also supported by the load-receiver and having a sector-gear; a pinion meshing with said sector-gear; a hub on the load-receiver; a shaft having a pinion passing through said hub and load-receiver; arms connected with the pinion and passing through apertures therein, said arms being adapted to frictionally engage said hub; and balls secured to said arms.

FRANCIS H. RICHARDS.

Witnesses:
F. N. CHASE,
WILBUR M. STONE.